Patented Nov. 5, 1929

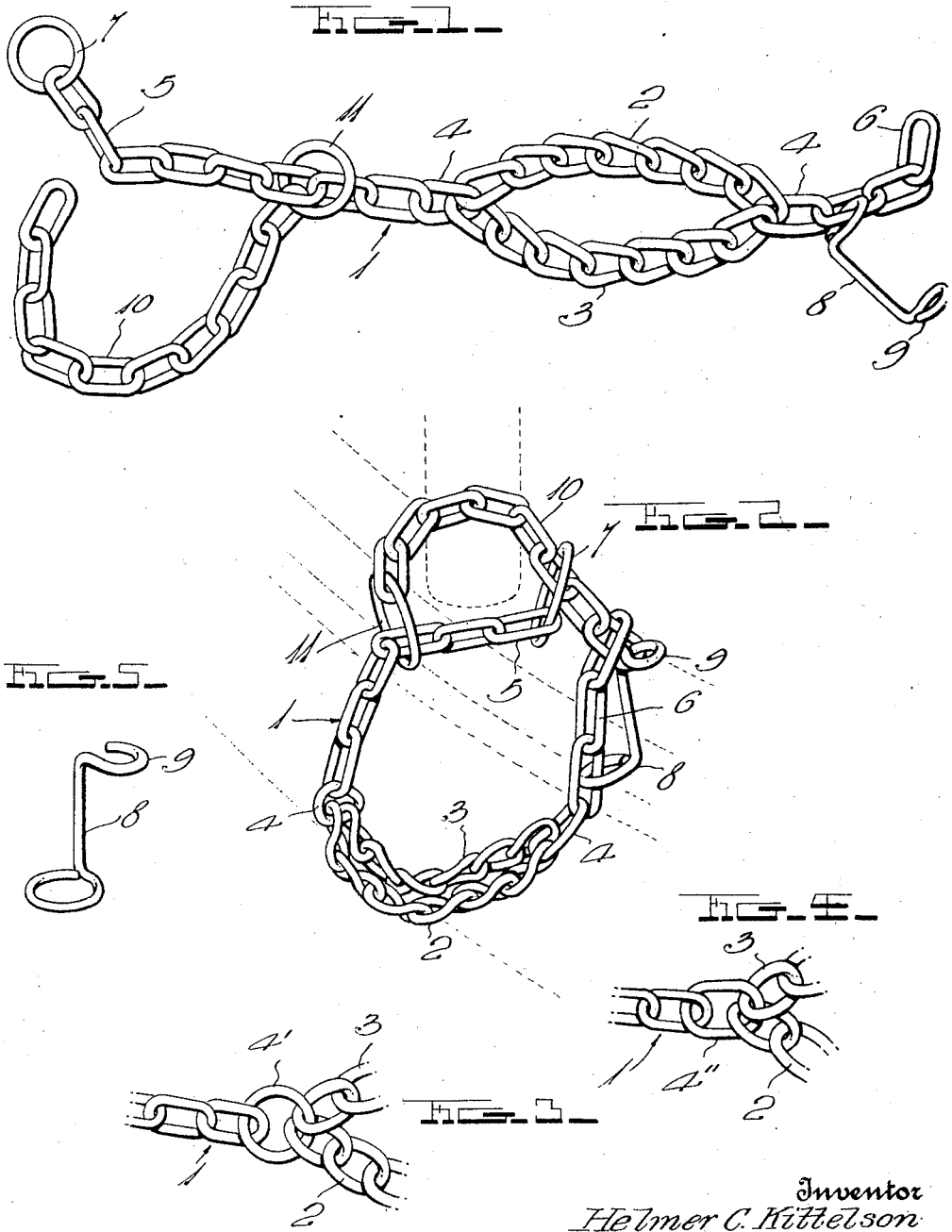

1,734,383

UNITED STATES PATENT OFFICE

HELMER C. KITTELSON, DECEASED, LATE OF FARGO, NORTH DAKOTA, BY JOSEPH O. ESTREM, ADMINISTRATOR, OF MINNEAPOLIS, MINNESOTA, ASSIGNOR TO STANDARD CHAIN COMPANY, INC., OF MINNEAPOLIS, MINNESOTA, A CORPORATION OF MINNESOTA

CHAIN STRUCTURE

Application filed July 6, 1925, Serial No. 41,896. Renewed May 24, 1926.

This invention relates generally to anti-skid and traction devices for motor vehicle wheels, and particularly to anti-skid chain units for such wheels.

The invention has been devised in order to provide a simple, strong, durable and inexpensive device of this character, and one which may be quickly and easily applied to an automobile wheel or removed therefrom, as well as a device which is provided with very effective and improved locking means.

According to the invention, the anti-skid chain unit is provided at one end with simple means whereby it may be engaged with one of the spokes of a wheel to prevent the device from creeping circumferentially around the wheel. At the other end, the device is provided with a simple and improved form of locking link, the free end of which is adapted for locking engagement with a link at the first mentioned end of the chain after the last mentioned link has been passed through the link at the end portion of the chain carrying the locking link.

The invention will be more readily understood from reference to the following detailed description taken in connection with the accompanying drawings which form a part of this specification.

A further important object of the invention is to provide in chain structure an improved and highly efficient double cross tread, so devised that the two tread chains will be cushioned flush against the tread of the tire when the vehicle is moving normally and will be caused to cross one another when an excess of traction is needed, such as in starting and stopping and when the wheels become embedded in snow or mud.

In the accompanying drawings:—

Figure 1 is an elevational view or plan of a tire chain unit constructed in accordance with the invention, showing the same spread out more or less flat;

Figure 2 is a perspective view of the unit coupled to the wheel of an automobile;

Figure 3 is an elevational view showing another method by which the tread chains may be fastened to the securing chains of the device;

Figure 4 is a similar view showing still another method by which the tread chains may be fastened to the securing chains; and Figure 5 is a perspective view of the locking device or link disconnected from the unit, said view illustrating a slightly different form of link than that illustrated in Figs. 1 and 2.

In the embodiment of the invention illustrated in Figs. 1 and 2, the numeral 1 designates as a whole a chain section which is adapted to extend transversely across the tread of the tire of a wheel and around the rim and felly.

I provide a novel tread portion comprising two cross chains 2 and 3 of equal length and preferably of twisted link construction. Cross chains 2 and 3 are connected at their ends to the end portions of the unit 1, or to side chains, if the same are used, by means of twisted links 4 as shown in Figs. 1 and 2, or by means of untwisted round links or eyes 4' as shown in Fig. 3, or by means of untwisted oval-shaped links 4'' as shown in Fig. 4.

The manner in which the cross chains are connected to links 4 is of great importance inasmuch as it is responsible for the improved results obtained. It will be noticed, see Fig. 1, that cross chain 2 has its left end connected to link 4 on the outer or upper side of the left end of cross chain 3, while the right hand end of cross chain 2 is connected to its link 4 on the inner or under side of the right hand end of cross chain 3.

The end portions 5 and 6 of the chain section 1, that is, the portions beyond the links 4 are of unequal lengths, the end portion 5 being longer than the end portion 6. To the link disposed at the free end of the end portion 5 of the chain section 1 and coupled thereto is an eye 7, while coupled to the end portion 6 of the chain section is a locking device or link 8.

The link 8 may be constructed as shown in Fig. 1, from which it will be seen that it is formed at its free end with a laterally extending hook 9. In this case, the hook 9 has its free end doubled upon itself and is closed, but it may be made as shown in Fig. 5, in which case the hook is opened.

Coupled to the longer end portion 5 of the chain section 1 is a chain section 10. Preferably, the means coupling the chain section 10 to the end portion 5 of the chain section 1 consists of an eye 11 which is slidable along the end portion 5 of the chain section 1 between the eye 7 and the link 4 coupling said end portion to the chain lengths 2 and 3.

In using the device, the two chain lengths 2 and 3 should be placed upon the tire of a vehicle wheel so as to extend transversely across the tread of the tire, and then the end portion 5 of the section 1 should be passed around the rim of the wheel and around the felly on one side of one of the spokes. The chain section 10 should be passed in a similar manner across the other side of the spoke. After this has been done, the free end of the chain section 10 should be inserted through the eye 7 and drawn tight, and then the end link or some link near the end of the section 10 should be passed through the link at the end of the end portion 6 of the section 1. After this has been done, the locking hook 9 should be engaged with the link of section 10 which has been passed through the end link of the end portion 6, as shown in Fig. 2.

When the device is applied to a motor vehicle wheel in the manner just described, it will be firmly fastened thereto so that it will not work loose or creep circumferentially around the tire of the wheel.

When the wheel is traveling normally over a relatively smooth surface, the cross chains 2 and 3 will lie side by side in spaced relation, as shown in Fig. 1, and will be cushioned flush against the tread of the tire, since each of the chains 2 and 3 has one end disposed above the other cross chain, and since these chains are of twisted link construction. This permits the wheel to ride smoothly and supplies an ample amount of traction for normal purposes. When, however, the vehicle is starting out or stopping, or when the wheel becomes embedded in snow or mud the chains 2 and 3 will be forced together and across each other in the manner shown in Fig. 2. As the wheel is moved forwardly the chain 2 will be crossed on the outer side of chain 3 while if the vehicle is moved rearwardly chain 3 will be crossed on the outer side of chain 2. The crossing of these chains supplies an unusual amount of traction when the same is needed, while as soon as the vehicle is in normal movement the cross chains are automatically restored to normal side by side position.

From the foregoing description taken in connection with the accompanying drawing, the construction, use and advantages of the invention will be readily understood.

It is obvious that many changes in form, proportion, and in various of the features of construction may be made without departing from the spirit and principle of the invention and without sacrificing any of the advantages thereof, so that it is to be understood that such may be done within the meaning and scope of the appended claims.

What is claimed is:—

1. An anti-skid chain unit comprising a chain section to extend transversely across and around the tread of a tire, an eye connected to one end of said section, a locking device coupled to said section at a point spaced slightly from the other end thereof and leaving said other end free, and a second chain section coupled to the first named section in advance of said eye and adapted to be passed through said eye, through the link at the last mentioned end of the first named section and then engaged by said locking device.

2. An anti-skid chain unit comprising a chain section to extend transversely across and around the tread of a tire, an eye connected to one end of said section, a locking device coupled to said section at a point spaced slightly from the other end thereof and leaving said other end free, a second eye slidable along the first mentioned end of said section in advance of the first named eye, and a second chain section coupled to the second named eye and adapted to be passed through the first named eye and the link at the last mentioned end of the first named section and then engaged by said locking device.

3. An anti-skid chain unit comprising a chain to extend transversely around the tire, rim and felly of a wheel, a locking device having one end coupled to said chain at a point spaced slightly from one end of the latter and leaving said one end of said chain free, the free end of said locking device being disposed opposite the last link of the adjacent end of the chain and adapted for locking engagement with a link at the other end of said chain after the link has been passed through the link at said one end of said chain.

4. An anti-skid chain unit comprising a chain to extend transversely around the tire, rim and felly of a wheel, a locking device having one end coupled to said chain at a point spaced slightly from one end of the latter and leaving said one end of said chain free, a hook extending laterally from the free end of said locking device opposite the last link of the adjacent end of the chain for locking engagement with a link at the other end of the chain after the link has been passed through the link at said one end of the chain.

5. An anti-skid chain unit comprising a chain section to extend transversely across and around the tread of a tire, rim and felly of a wheel, an eye at one end of the chain, a locking device near the other end of the chain, and a separate chain section having an eye at one end for slidable coupling to the other chain near the eye-carrying end, said separate chain section being adapted for looping around a wheel spoke and having the other end passed through the first eye and engaged by the locking device.

6. A transverse traction element for a vehicle traction attachment including a pair of chain sections arranged side by side and means at the ends of such pair to secure said ends together, one of said means holding the ends of the sections in lapped contact with each other.

7. A transverse traction element for a vehicle traction attachment including a pair of chain sections arranged side by side and means at the ends of such pair to secure the ends of the sections together, one of said means holding the end of one chain section in lapped contact with one side of the corresponding end of the other chain section and the other of said means holding the end of the first chain section in lapped contact with the opposite side of the corresponding end of the other chain section.

8. A transverse traction element for a vehicle traction attachment including a pair of individual chain sections arranged side by side and with their links in staggered relation to each other and means at the ends of such pair to secure said ends together with the links of the chain sections permanently so staggered.

9. A transverse traction element for a vehicle traction attachment including a pair of chain sections arranged side by side and an eyed coupling member penetrating end links of the pair of chains and holding said links in offset relation to each other longitudinally of said sections.

10. A transverse traction element for a vehicle traction attachment including a pair of chain sections of substantially equal length arranged side by side, and means at the ends of said pair to secure said ends together, one of said means holding the ends of said sections in lapped contact with each other.

In testimony whereof, I have hereunto affixed my signature.

JOSEPH O. ESTREM,
*Administrator of the Estate of Helmer C. Kittelson, deceased.*